(12) United States Patent
Cho et al.

(10) Patent No.: US 11,016,881 B2
(45) Date of Patent: May 25, 2021

(54) MEMORY SYSTEM AND OPERATING METHOD THEREOF

(71) Applicant: SK hynix Inc., Gyeonggi-do (KR)

(72) Inventors: Young-Ick Cho, Seoul (KR); Byeong-Gyu Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 15 days.

(21) Appl. No.: 16/684,037

(22) Filed: Nov. 14, 2019

(65) Prior Publication Data

US 2020/0192792 A1 Jun. 18, 2020

(30) Foreign Application Priority Data

Dec. 17, 2018 (KR) .................. 10-2018-0163281

(51) Int. Cl.
*G06F 12/00* (2006.01)
*G06F 12/02* (2006.01)
*G06F 12/06* (2006.01)
*G06F 12/0873* (2016.01)
*G06F 12/10* (2016.01)

(52) U.S. Cl.
CPC ...... *G06F 12/0246* (2013.01); *G06F 12/0646* (2013.01); *G06F 12/0873* (2013.01); *G06F 12/10* (2013.01); *G06F 2212/65* (2013.01); *G06F 2212/657* (2013.01); *G06F 2212/7201* (2013.01)

(58) Field of Classification Search
CPC ............. G06F 12/0246; G06F 12/0646; G06F 12/0873; G06F 12/10; G06F 2212/65; G06F 2212/657; G06F 2212/7201
See application file for complete search history.

(56) References Cited

U.S. PATENT DOCUMENTS

| 2012/0060012 A1* | 3/2012 | Olszewski | .......... G06F 12/1009 711/171 |
| 2016/0117252 A1* | 4/2016 | Thangaraj | .......... G06F 12/0871 711/118 |
| 2018/0203637 A1* | 7/2018 | Furuya | .................. G06F 3/0641 |

(Continued)

FOREIGN PATENT DOCUMENTS

| KR | 10-1457270 | 10/2014 |
| KR | 10-2015-0010729 | 1/2015 |

*Primary Examiner* — John A Lane
(74) *Attorney, Agent, or Firm* — IP&T Group LLP

(57) ABSTRACT

A memory system includes a memory device for storing first and second mapping information associated with target logical addresses for an unmap command, and a controller for loading the first and second mapping information from the memory device, comparing a size of target map data corresponding to the target logical addresses with a threshold value, sorting a plurality of map segments mapped with a plurality of target logical groups including the target logical addresses, respectively, into a plurality of regions based on a result of the comparing, and performing an unmap operation on each of the map segments included in the regions, wherein the first mapping information includes information on mapping relationships between the plurality of map segments and the plurality of target logical groups, and the second mapping information includes information on mapping relationships between the target logical addresses and corresponding physical addresses.

20 Claims, 15 Drawing Sheets

(56) References Cited

U.S. PATENT DOCUMENTS

| | | | |
|---|---|---|---|
| 2018/0275873 A1* | 9/2018 | Frid | G06F 12/0246 |
| 2019/0294364 A1* | 9/2019 | Wang | G06F 3/0673 |
| 2020/0057724 A1* | 2/2020 | Byun | G06F 12/10 |
| 2020/0081830 A1* | 3/2020 | Desai | G06F 12/0246 |
| 2020/0081833 A1* | 3/2020 | Lee | G06F 12/10 |
| 2020/0097397 A1* | 3/2020 | Lee | G06F 3/0619 |
| 2020/0233602 A1* | 7/2020 | Li | G06F 3/0644 |

* cited by examiner

FIG. 5A

| Flag | Segment | LBA |
|---|---|---|
| M | 1 | LBA<1:K> |
| U | 2 | LBA<K+1:2K> |
| U | 3 | LBA<2K+1:3K> |
| M | 4 | LBA<3K+1:4K> |
| ⋮ | | |
| M | N | LBA<(N-1)K+1:NK> |

| Segment | Flag | LBA | PBA |
|---|---|---|---|
| 1 | M | 1 | 56 |
| | U | 2 | 17 |
| | U | 3 | 11 |
| | M | 4 | 6 |
| | ⋮ | | |
| | M | K | 8 |

530

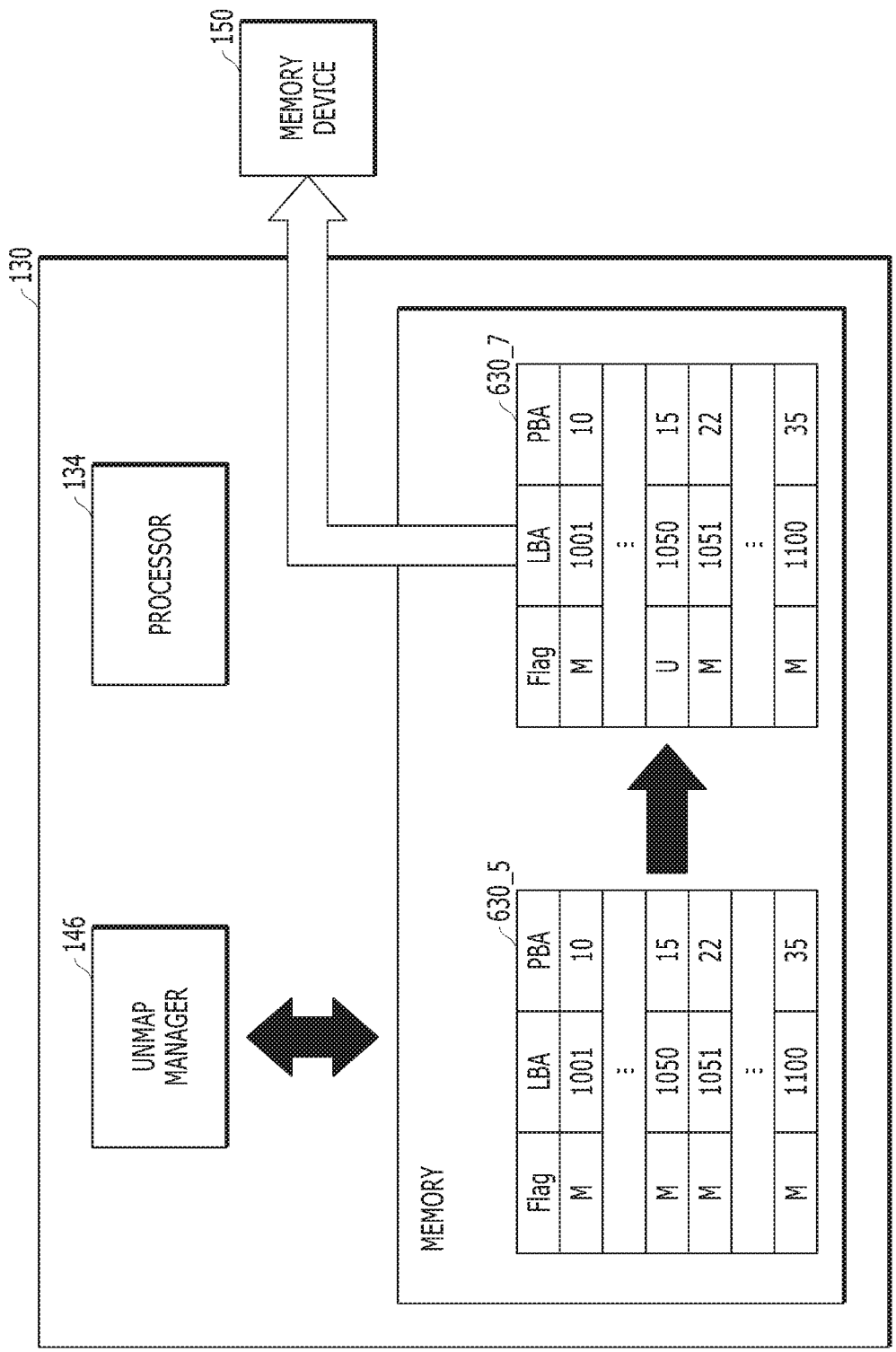

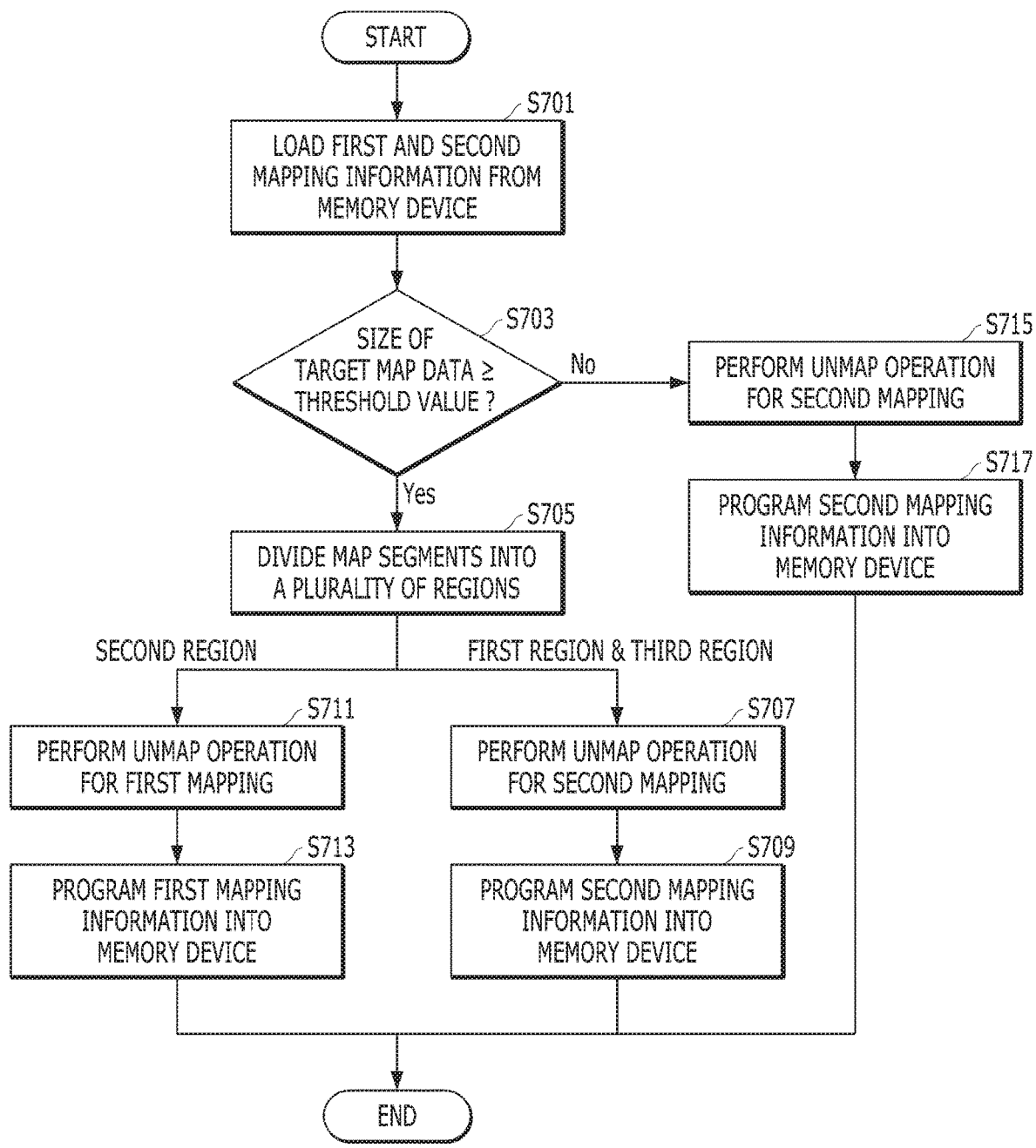

MEMORY SYSTEM AND OPERATING METHOD THEREOF

CROSS-REFERENCE TO RELATED APPLICATION

The present application claims priority under 35 U.S.C. § 119(a) to Korean Patent Application No. 10-2018-0163281, filed on Dec. 17, 2018, the disclosure of which is incorporated herein by reference in its entirety.

BACKGROUND

1. Field

Various embodiments relate to a memory system, and more particularly, to a memory system capable of efficiently processing an unmap command, and an operating method of the memory system.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments of the present invention are directed to a memory system that may efficiently process an unmap command provided from a host.

In accordance with an embodiment, a memory system includes: a memory device suitable for storing first mapping information and second mapping information associated with target logical addresses for an unmap command; and a controller suitable for loading the first and second mapping information from the memory device, comparing a size of target map data corresponding to the target logical addresses with a threshold value, sorting a plurality of map segments mapped with a plurality of target logical groups including one or more of the target logical addresses, respectively, into a plurality of regions based on a result of the comparing, and performing an unmap operation on each of the map segments included in the plurality of regions, wherein the first mapping information includes information on mapping relationships between the plurality of map segments and the plurality of target logical groups, and the second mapping information includes information on mapping relationships between the target logical addresses and corresponding physical addresses.

In accordance with an embodiment, an operating method of a memory system, the operating method includes: receiving the unmap command; loading first mapping information and second mapping information associated with target logical addresses corresponding to the unmap command from a memory device, and storing the first and second mapping information in a memory; comparing a size of target map data corresponding to the target logical addresses with a threshold value; sorting a plurality of map segments mapped with a plurality of target logical groups including one or more of the target logical addresses, respectively, into a plurality of regions based on a result of the comparing; and performing an unmap operation on each of map segments included in any one of the plurality of regions, wherein the first mapping information includes information on mapping relationships between the plurality of map segments and the plurality of target logical groups, and the second mapping information includes information on mapping relationships between the target logical addresses and corresponding physical addresses.

In accordance with an embodiment, a memory system includes: a memory device suitable for storing first mapping information and second mapping information, the first mapping information including information on mapping between a plurality of map segments and a plurality of logical groups, each logical group including one or more logical addresses, and the second mapping information including information on mapping between a plurality of logical addresses and a plurality of physical addresses; and a controller including a memory, suitable for: loading, from the memory device, the first mapping information and the second mapping information associated with an unmap command, in the memory; dividing the plurality of map segments, which includes a first map segment, a last map segment and remaining map segments, into a first group that includes the first map segment, a second group that includes the remaining map segments and a third group that includes the last map segment; and unmapping and second mapping information for the first and third groups, and the first mapping information for the second group.

BRIEF DESCRIPTION OF THE DRAWINGS

FIG. 5A is a diagram illustrating a structure of a first table in accordance with an embodiment of the present invention.

FIG. 5B is a diagram illustrating a structure of a second table in accordance with an embodiment of the present invention.

FIGS. 6A to 6E are diagram illustrating an operation of a memory system in accordance with an embodiment of the present invention.

FIG. 7 is a flowchart illustrating an operating process of a memory system in accordance with an embodiment of the present invention.

DETAILED DESCRIPTION

Various embodiments of the present invention are described below in more detail with reference to the accompanying drawings. The following description focuses on detail pertaining to features and aspects of the present invention. So as not to obscure such description, well-known technical information may be omitted. Also, throughout the specification, reference to "an embodiment," "another embodiment" or the like is not necessarily to only one embodiment, and different references to any such phrase are not necessarily to the same embodiment(s).

Figure 1:
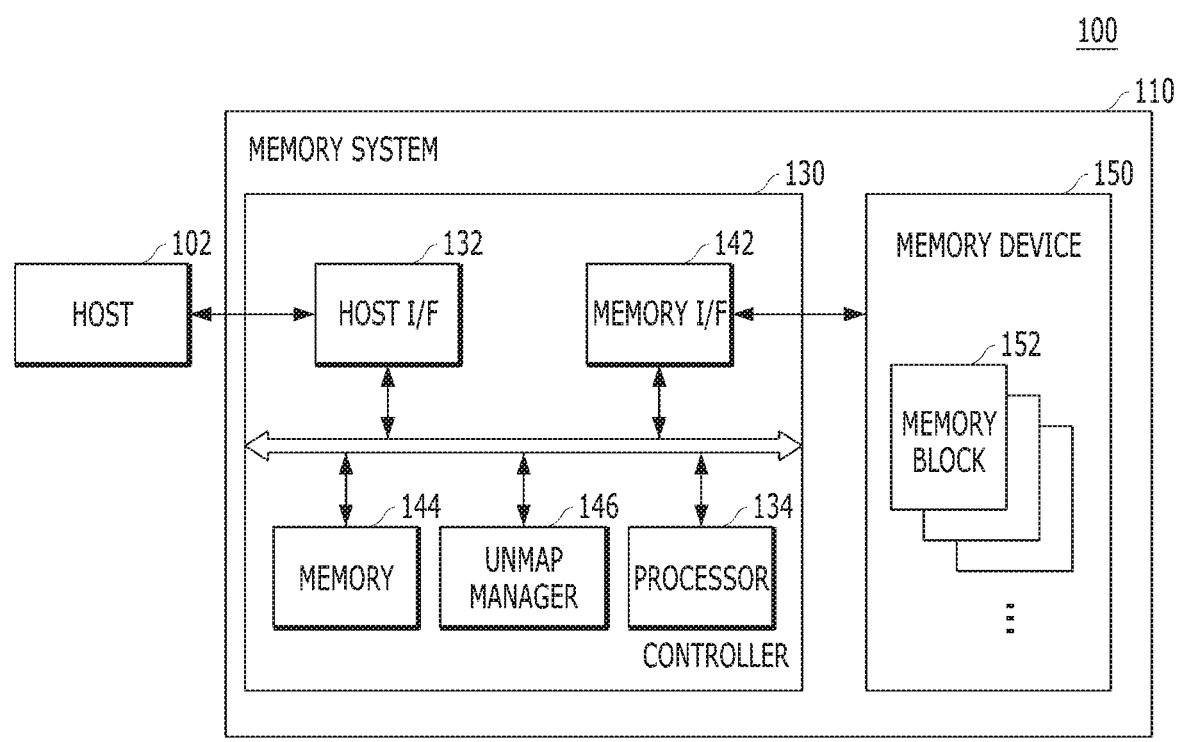
FIG. 1 is a block diagram illustrating a data processing system including a memory system in accordance with an embodiment of the present invention.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the host 102 may provide write command, read command, erase command, and unmap command with the memory system 110, and the memory system 110 may perform operations corresponding to the commands.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and micro-SD card.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory.

The memory system 110 may include a controller 130 and a memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device. Non-limiting application examples of the memory system 110 include a computer, smart phone, and a portable game machine.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks. Each of the plurality of memory blocks 152 may include a plurality of pages, and each of the pages may include a plurality of memory cells coupled to a word line. The memory device 150 may include a plurality of planes each of which may include the plurality of memory blocks 152, and include a plurality of memory dies each of which may include the plurality of planes. In an embodiment, the memory device 150 may be a flash memory. The flash memory may have a 3-dimensional (3D) stack structure.

Since the structure of the memory device 150 including its 3D stack structure are described in detail below with reference to FIGS. 2 to 4, further description of these elements and features are omitted here.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

More specifically, the controller 130 may include a host interface (I/F) 132, a processor 134, a memory interface (I/F) 142, a memory 144 and an unmap manager 146.

The host interface (I/F) 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE). The host I/F 132 may be driven through firmware referred to as a host interface layer (HIL) in order to exchange data with the host.

The memory I/F 142 may serve as a memory/storage interface for interfacing the controller 130 and the memory device 150 such that the controller 130 controls the memory device 150 in response to a request from the host 102.

The memory 144 may serve as a working memory of the memory system 110 and the controller 130, and store data for driving the memory system 110 and the controller 130.

The memory 144 may be embodied by a volatile memory. For example, the memory 144 may be embodied by static random access memory (SRAM) or dynamic random access memory (DRAM). The memory 144 may be disposed within or out of the controller 130. In an embodiment, FIG. 1 exemplifies the memory 144 disposed within the controller 130. In another embodiment, the memory 144 may be embodied by an external volatile memory having a memory interface transferring data between the memory 144 and the controller 130.

As described above, the memory 144 may store data required for performing a data write/read operation between the host 102 and the memory device 150 and data when the data write/read operation is performed. In order to store such data, the memory 144 may include a program memory, data memory, write buffer/cache, read buffer/cache, data buffer/cache, map buffer/cache or the like.

Furthermore, the memory 144 may store a map segment and map data loaded from the memory device 150 under the control of the processor 134. The map data may indicate a relationship between a logical block address corresponding to data provided from the host 102 and a physical block address corresponding to a location where data provided from the host 102 is actually stored in the memory device 150. The map segment may be a map data group composed of a plurality pieces of map data. For example, one map segment may contain 100 pieces of map data. Also, the memory 144 may manage each of the map segment and the map data as a table under the control of the processor 134.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

For example, the controller 130 may perform an operation requested by the host 102 through the processor 134. In other words, the controller 130 may perform a command operation corresponding to a command received from the host 102. The controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command.

The unmap manager 146 may perform an unmap operation according to an unmap command provided from the host 102. When the unmap command from the host 102 is provided to the controller 130, the unmap manager 146 may receive target logical addresses for the unmap command provided from the host 102 under the control of the processor 134. Subsequently, the unmap manager 146 may compare the entire size of map data corresponding to each of the target logical addresses with a threshold value, which may be predetermined. When the entire size of the map data is greater than or equal to the threshold value, the unmap manager 146 may sort a plurality of map segments including the map data into a plurality of regions. The unmap manager 146 may perform the unmap operation of unmapping the map segments or the map data in a different manner for each of the regions. Although FIG. 1 illustrates that the unmap manager 146 is a separate component from the processor 134, the unmap manager 146 may be included in the processor 134 depending on a design scheme.

Furthermore, although not shown in the drawings, the controller 130 may further include an error correction code (ECC) component and a power management unit (PMU).

The ECC component may correct error bits of data processed in the memory device 150, and include an ECC encoder and an ECC decoder.

The ECC encoder may generate data with a parity bit by performing error correction encoding on data to be programmed into the memory device 150, and the data with the parity bit may be stored in the memory device 150. The ECC decoder detects and corrects errors included in data read from the memory device 150 when reading the data stored in the memory device 150.

The ECC component may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component is not limited to any specific error correction technique or structure. The ECC component may include any and all circuits, modules, systems or devices for error correction.

The PMU may provide and manage power of the controller 130.

A memory device of the memory system in accordance with an embodiment of the present invention is described in detail with reference to FIGS. 2 to 4.

Figure 2:
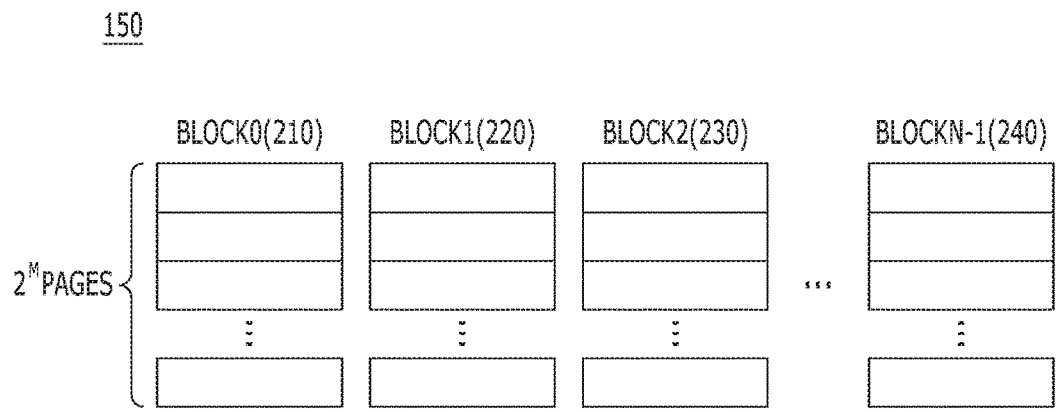
FIG. 2 is a schematic diagram illustrating a memory device employed in the memory system of FIG. 1.

FIG. 2 is a schematic diagram illustrating the memory device 150. FIG. 3 is a circuit diagram illustrating an exemplary configuration of a memory cell array of a memory block in the memory device 150. FIG. 4 is a schematic diagram illustrating an exemplary three-dimensional (3D) structure of the memory device 150.

Referring to FIG. 2, the memory device 150 may include a plurality of memory blocks BLOCK0 (210), BLOCK1 (220), BLOCK2 (230), and to BLOCKN-1 (240). Each of the memory blocks 210, 220, 230 and 240 may include a plurality of pages, for example $2^M$ pages, the number of which may vary according to circuit design. For example, in some applications, each of the memory blocks may include M pages. Each of the pages may include a plurality of memory cells that are coupled to a word line WL.

The memory device 150 may include not only multi-level cell (MLC) memory blocks, each of which includes a plurality of pages that are realized by memory cells capable of storing two-bit data in one memory cell, but also triple level cell (TLC) memory blocks each of which includes a plurality of pages that are realized by memory cells capable of storing three-bit data in one memory cell, quadruple level cell (QLC) memory blocks each of which includes a plurality of pages that are realized by memory cells capable of storing four-bit data in one memory cell, and/or higher level cell memory blocks each of which includes a plurality of pages that are realized by memory cells capable of storing five or more-bit data in one memory cell.

In accordance with an embodiment of the present invention, the memory device 150 is described as a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM).

The memory blocks 210, 220, 230, 240 may store the data transferred from the host 102 through a program operation, and transfer data stored therein to the host 102 through a read operation.

Figure 3:
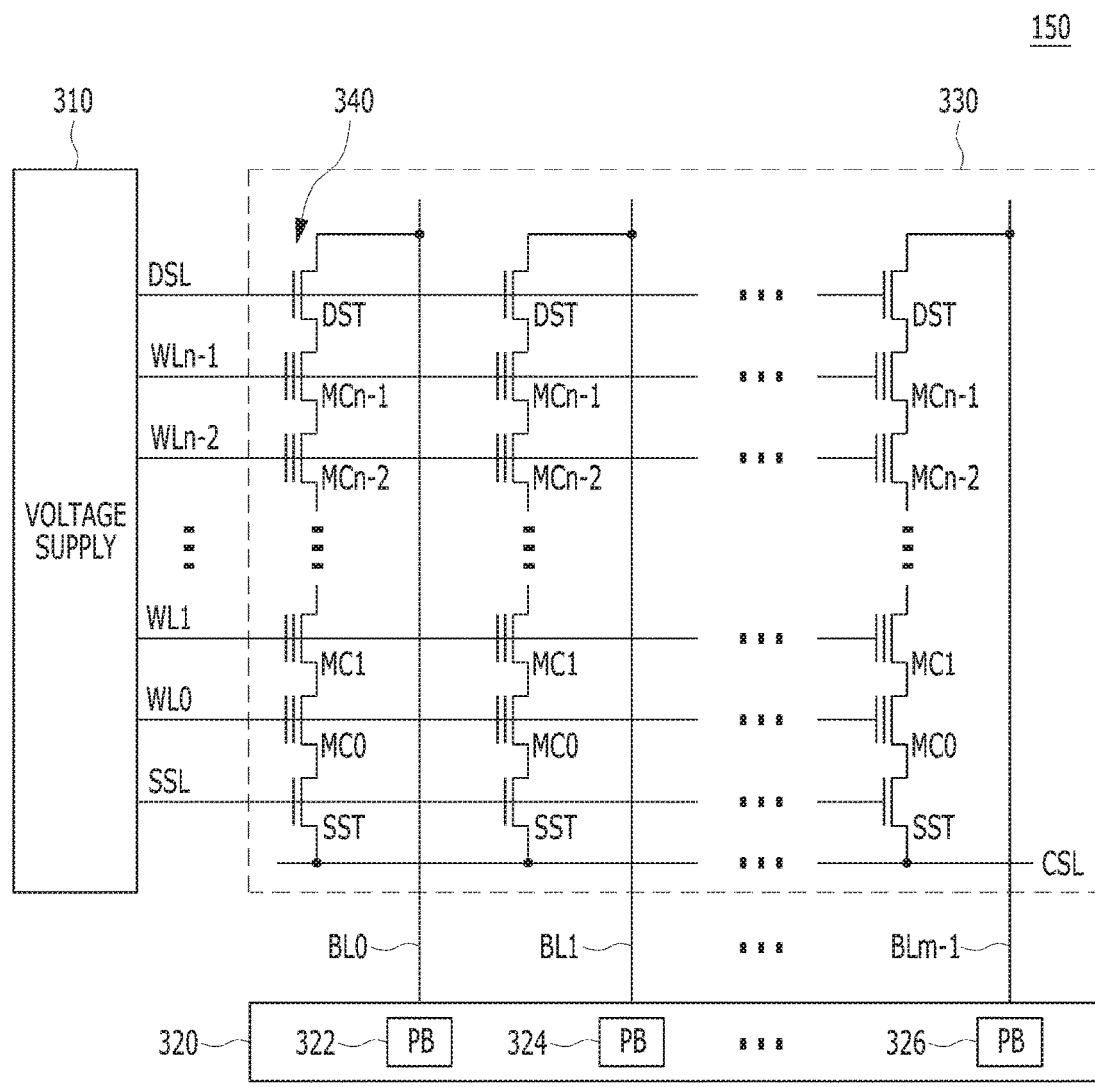
FIG. 3 is a circuit diagram illustrating a memory cell array of a memory block in the memory device.
Figure 4:
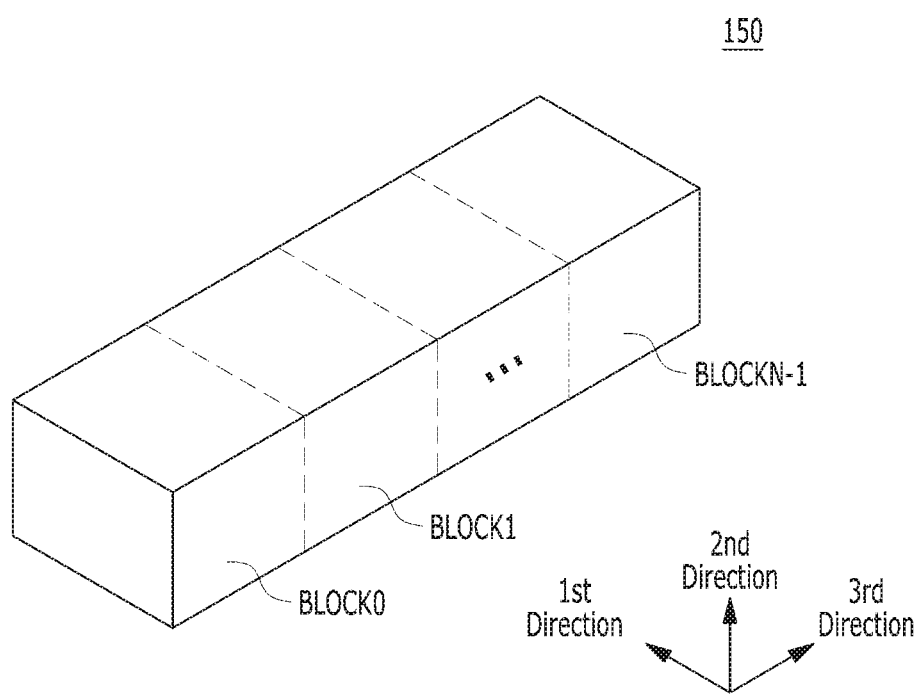
FIG. 4 is a block diagram illustrating an exemplary three-dimensional structure of the memory device.

Referring to FIG. 3, a memory block 330, which may correspond to any of the plurality of memory blocks 152 to 156 in the memory device 150 of the memory system 110, may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells or memory cell transistors MC0 to MCn-1 may be coupled in series. In an embodiment, each of the memory cells MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1. For reference, in FIG. 3, 'DSL' denotes a drain select line, 'SSL' denotes a source select line, and 'CSL' denotes a common source line.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

The memory device 150 may be embodied by a two-dimensional (2D) or three-dimensional (3D) memory device. Particularly, as illustrated in FIG. 4, the memory device 150 may be embodied by a nonvolatile memory device having a 3D stack structure. When the memory device 150 has a 3D structure, each of the plurality of memory blocks BLOCK0 to BLOCKN-1 may also have a 3D structure.

Each memory block 330 included in the memory device 150 may include a plurality of NAND strings NS that extend in the second direction, and a plurality of NAND strings NS (not shown) that extend in the first direction and the third direction. Each of the NAND strings NS may be coupled to a bit line BL, at least one drain selection line DSL, at least one source selection line SSL, a plurality of word lines WL, at least one dummy word line DWL (not shown), and a common source line CSL, and each of the NAND strings NS may include a plurality of transistor structures.

In short, each memory block 330 of the memory device 150 may be coupled to a plurality of bit lines BL, a plurality of drain selection lines DSL, a plurality of source selection lines SSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a drain selection transistor DST of each NAND string NS may be coupled to a corresponding bit line BL, and a source selection transistor SST of each NAND string NS may be coupled to a common source line CSL. Memory cells MC may be provided between the drain selection transistor DST and the source selection transistor SST of each NAND string NS. In other words, a plurality of memory cells may be realized in each memory block 330 of the memory device 150.

As described with reference to FIG. 1, the memory 144 may manage each of the map segments and each of the map data using tables under the control of the processor 134. For example, as shown in FIGS. 5A and 5B, information on the map segments may be stored in a first table 510, and information on the map data may be stored in a second table 530. The first table 510 and the second table 530 are described with reference to FIGS. 5A and 5B.

FIG. 5A is a diagram illustrating a structure of the first table 510 in accordance with an embodiment.

Referring to FIG. 5A, the first table 510 may represent a mapping relationship between a map segment and a logical address group including a plurality of logical addresses (first mapping). Plural pieces of first mapping information may be stored in the first table 510. The first mapping information may include map segments, logical addresses or logical block addresses (LBA) and first flag information (Flag). The first flag information may indicate whether or not the first mapping is performed. The first table 510 indicates that a first map segment having the first flag information 'M' is mapped with a first logical group including first to $K^{th}$ logical addresses LBA <1:K>. Further, the first table 510 indicates that a second map segment having the first flag information 'U' is not mapped with a second logical address including $(K+1)^{th}$ to $2K^{th}$ logical addresses LBA <K+1:2K>. Similarly, the first table 510 indicates for each of remaining map segments whether or not it is mapped with corresponding logical addresses.

FIG. 5B is a diagram illustrating a structure of the second table 530 in accordance with an embodiment.

Referring to FIG. 5B, the second table 530 may represent a mapping relationship between logical address information and physical address information (second mapping). Plural pieces of second mapping information may be stored in the second table 530. The second mapping information may include logical addresses (LBA), physical addresses (PBA) and second flag information (Flag). The second flag information may indicate whether or not the second mapping is performed. For example, the second table 530 may indicate that a first logical address LBA 1 having the second flag information 'M' is mapped with a $56^{th}$ physical address PBA 56. Further, the second table 530 may indicate that a third logical address LBA 3 having the second flag information 'U' is not mapped with an $11^{th}$ physical address PBA 11. Similarly, the second table 530 indicates for each of remaining logical addresses whether or not it is mapped with the corresponding physical address.

The second table 530 represents the second mapping information on a map segment basis. The second table 530 represents the second mapping information of each of the first to $K^{th}$ logical addresses which are mapped with a first map segment. Although FIG. 5 illustrates only the second mapping information of each of the first to $K^{th}$ logical addresses which are mapped with the first map segment, this is merely an example, and the second table 530 may be configured for each of a plurality of map segments.

The first table 510 and the second table 530 shown in FIGS. 5A and 5B, respectively, may be stored in the memory device 150 under the control of the processor 134.

Referring again to FIG. 1, the processor 134 may load the first and second tables 510 and 530 from the memory device 150 into the memory 144 to process the unmap command provided from the host 102.

The unmap manager 146 may process the unmap command provided from the host 102 with reference to the first and second tables 510 and 530 stored in the memory 144. The unmap manager 146 may perform the unmap operation of unmapping the first mapping and/or the second mapping according to the unmap command provided from the host 102. Particularly, the memory system 110 according to the present embodiment may efficiently perform the unmap operation according to the unmap command for a plurality of logical addresses. Operation of the memory system 110 in accordance with an embodiment is described below in detail.

FIGS. 6A to 6E are diagrams illustrating the operation of the memory system 110 in accordance with an embodiment. By way of example, it is assumed that each of the map segments is mapped with 100 logical addresses. Furthermore, it is assumed that a first map segment is mapped with first to $100^{th}$ logical addresses, and a second map segment is mapped with $101^{st}$ to $200^{th}$ logical addresses. In the same manner, it is assumed that each of third to $11^{th}$ map segments is mapped with a corresponding group of 100 logical addresses. It is assumed that the entire size of map data for an unmap command provided from the host 102 is greater than or equal to a threshold value, which may be predetermined. The operation of the memory system 110 described below is merely an example.

Figure 6A:
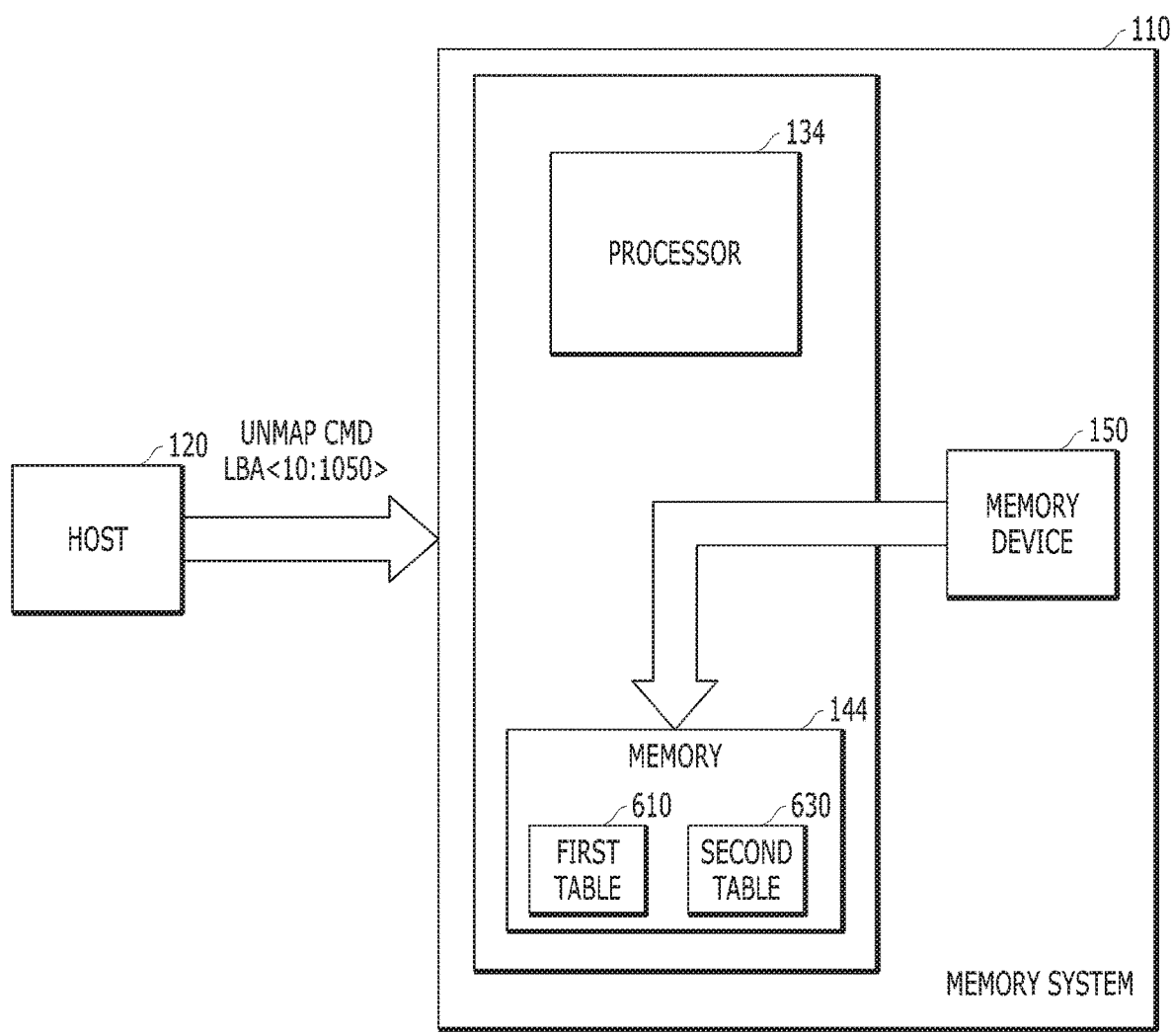

Referring to FIG. 6A, the host 102 may provide an unmap command for the $10^{th}$ to $1050^{th}$ logical addresses LBA <10:1050> to the memory system 110. When the unmap command is received from the host 102, the processor 134 of the controller 130 may load first mapping information and second mapping information associated with target logical addresses from the memory device 150. The target logical addresses indicate the $10^{th}$ to $1050^{th}$ logical addresses LBA <10:1050>. In other words, the processor 134 may read the first mapping information on the first to $11^{th}$ map segments and the second mapping information on each of the $10^{th}$ to $1050^{th}$ logical addresses LBA <10:1050> from the memory device 150, and store the first and second mapping information in the memory 144. In addition, the processor 134 may load a first table 610 and a second table 630 in which the first mapping information and the second mapping information are stored, respectively, from the memory device 150. Particularly, even though the first mapping information and the second mapping information are already stored in the memory 144, the processor 134 may read the first and second mapping information from the memory device 150, and store the read information in the memory 144 again. Since the first and second mapping information stored in the memory device 150 are the most recently updated information, the processor 134 may load the first and second mapping information from the memory device 150 when the unmap command is received.

Figure 6B:
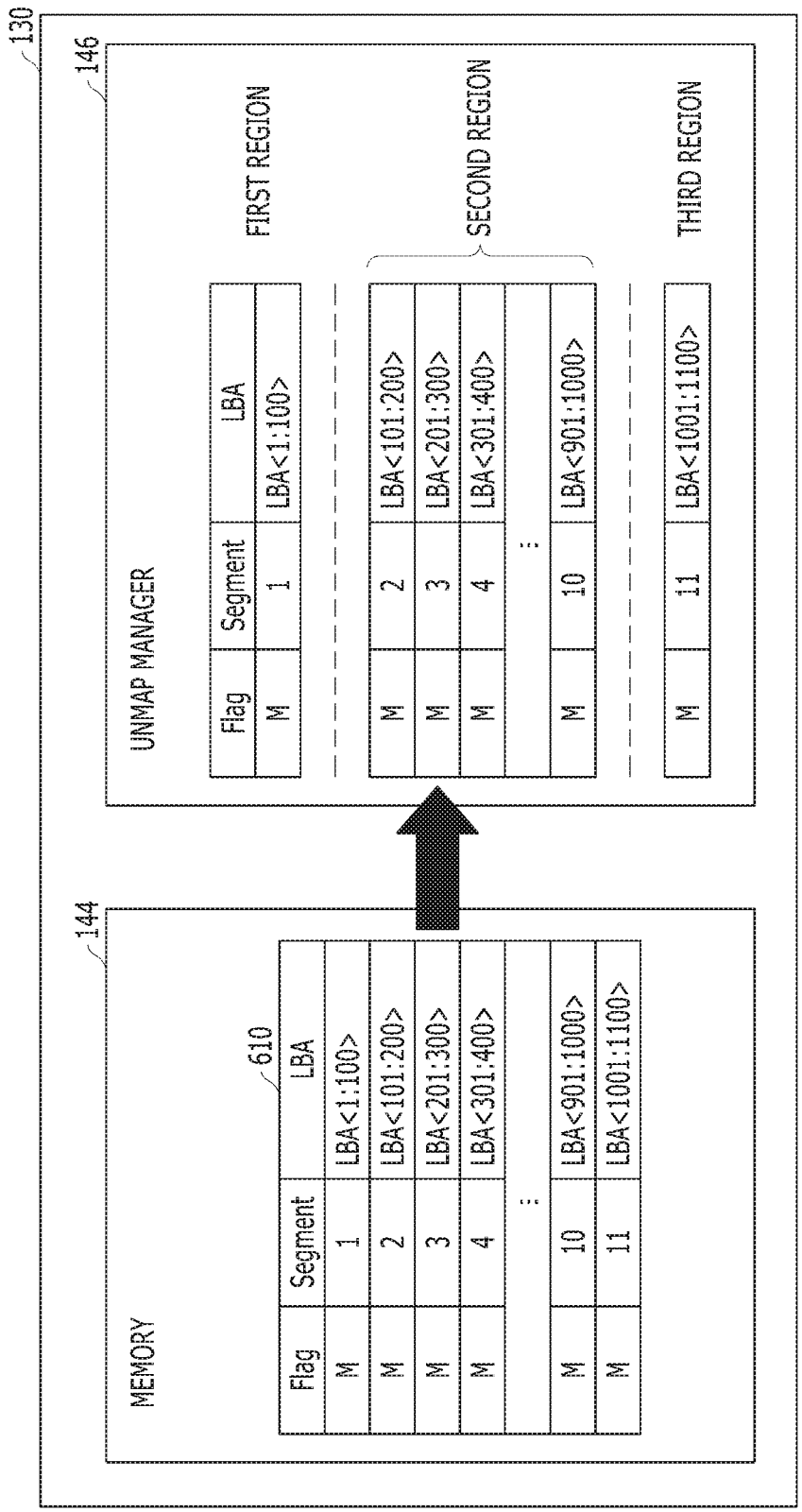

Referring to FIG. 6B, the unmap manager 146 may compare the entire size of the map data for the unmap command provided from the host 102 with the threshold value. The threshold value may be set according to system or processing considerations. When the entire size of the map data for the unmap command is greater than or equal to the threshold value, the unmap manager 146 may sort a plurality of map segments into a first region (e.g., head region), a second region (e.g., body region) and a third region (e.g., tail region) based on the first table 610 stored in the memory 144.

Specifically, the unmap manager 146 may sort map segments into the first region or the third region. The map segments into the first region or the third region may be mapped with a logical group in which only some of a plurality of logical addresses are the target logical addresses. On the other hand, the unmap manager 146 may sort map segments into the second region. The map segments into the second region may be mapped with a logical group in which all the logical addresses are the target logical addresses. For example, the unmap manager 146 may sort the first map segment into the first region (or head region). The first map segment may be mapped with a logical group including the $10^{th}$ logical address LBA 10 which is a starting logical address of the target logical addresses. The unmap manager 146 may sort the $11^{th}$ map segment into the third region (or tail region). The $11^{th}$ map segment may be mapped with a logical group including the $1050^{th}$ logical address LBA 1050 which is the last logical address of the target logical addresses. The unmap manager 146 may sort the second to $10^{th}$ map segments into the second region (or body region).

The unmap manager 146 may perform the unmap operation on the first to third regions in different ways.

Figure 6C:
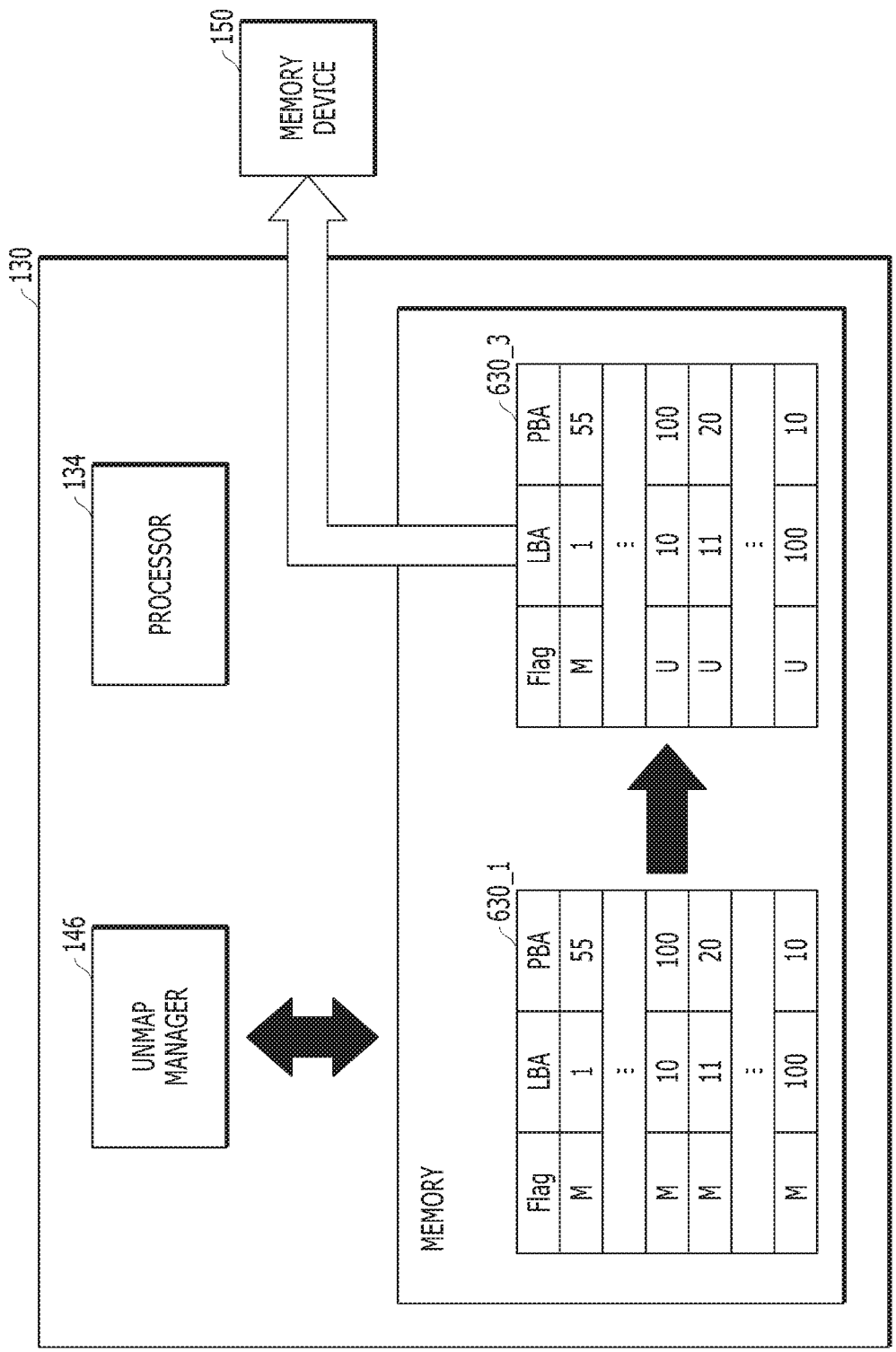

Referring to FIG. 6C, the unmap manager 146 may perform the unmap operation for the second mapping of the target logical addresses among the plurality of logical addresses, which are included in the logical group mapped with the first map segment in the first region. In FIG. 6C, the second table 630_1 indicates the state of the second table 630 before the unmap operation is performed, and the second table 630_3 indicates the state of the second table 630 after the unmap operation is performed. Specifically, the target logical addresses among the plurality of logical addresses, which are included in the logical group mapped with the first map segment, are the $10^{th}$ to $100^{th}$ logical addresses LBA 10 to LBA 100. The unmap manager 146 may independently unmap the second mapping of each of the $10^{th}$ to $100^{th}$ logical addresses LBA 10 to LBA 100 according to the unmap command. The unmap manager 146 may update the second flag information corresponding to each of the $10^{th}$ to $100^{th}$ logical addresses LBA 10 to LBA 100 stored in a second table 630_3 from 'M' to 'U'. The processor 134 may store, in the memory device 150, the second table 630_3 in which the unmapping information on each of the $10^{th}$ to $100^{th}$ logical addresses LBA 10 to LBA 100 is stored.

Figure 6D:
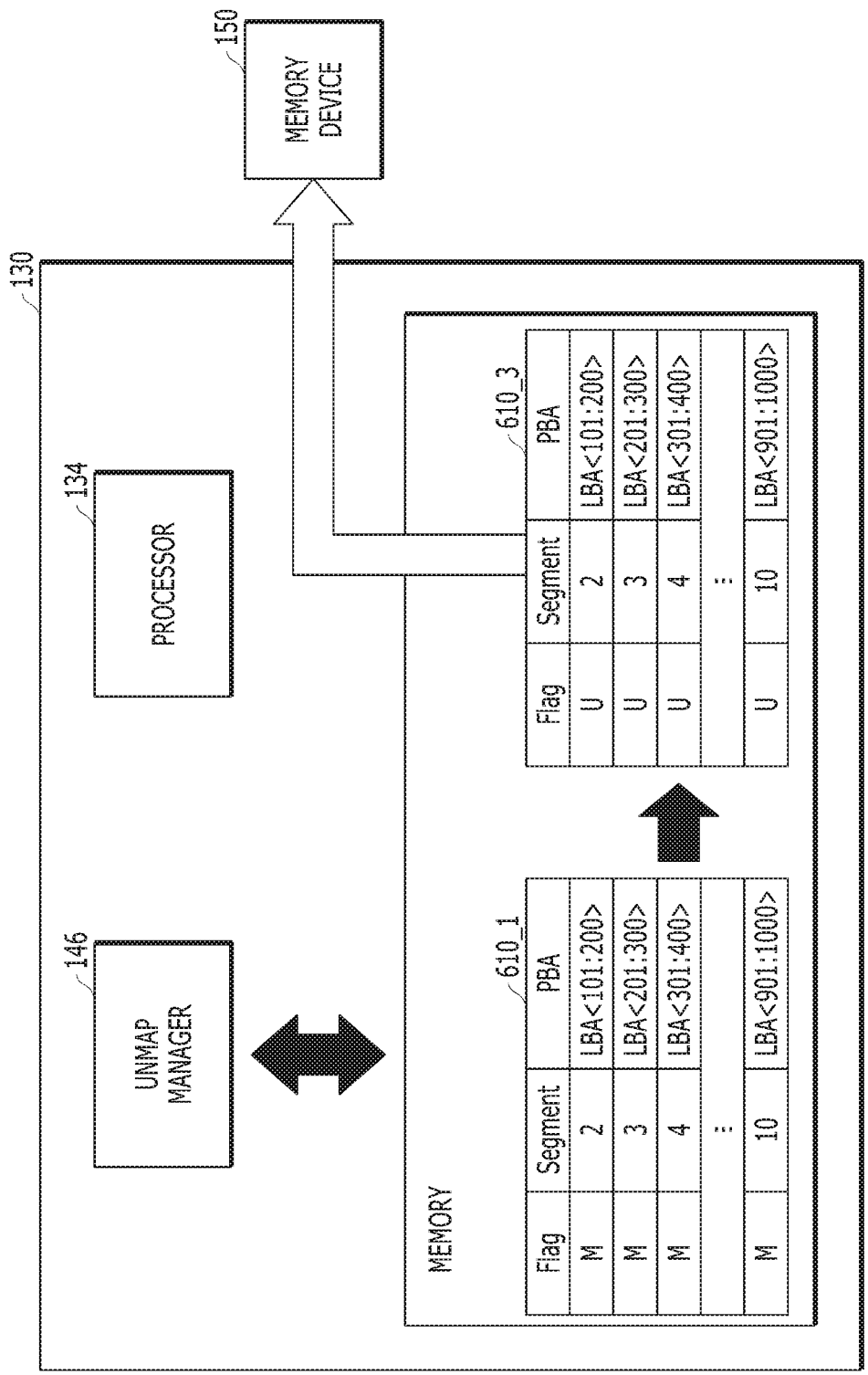

Referring to FIG. 6D, the unmap manager 146 may perform the unmap operation for the first mapping of each of the second to $10^{th}$ map segments in the second region. In FIG. 6D, the first table 610_1 indicates the state of the first table 610 before the unmap operation is performed, and the first table 610_3 indicates the state of the first table 610 after the unmap operation is performed. A plurality of logical addresses, which is included in the logical group mapped with each of the plurality of map segments in the second region, are all included in the target logical addresses. In other words, the logical group mapped to each of the second to $10^{th}$ map segments may include the $101^{st}$ to $1000^{th}$ logical addresses LBA <101:1000>, which are some of the target logical addresses. Accordingly, the unmap manager 146 does not perform the unmap operation for the second mapping like the first region.

In this case, the unmap manager 146 may unmap the first mapping of each of the second to $10^{th}$ map segments. In other words, the unmap manager 146 may remove a mapping relationship between the second map segment and the $101^{st}$ to $200^{th}$ logical addresses LBA <101:200> based on the first table 610_1. In addition, the unmap manager 146 may remove a mapping relationship between the third map segment and the $201^{st}$ to $300^{th}$ logical addresses LBA <201: 300>. In the same manner, the unmap manager 146 may remove a mapping relationship between a plurality of logical addresses mapped with each of the fourth to $10^{th}$ map segments.

When the second mapping of each of the $101^{st}$ to $1000^{th}$ logical addresses LBA 101 to LBA 1000 is to be unmapped, a total of '900' unmap operations has to be performed. However, the unmap manager 146 may perform a total of '9' unmap operations by unmapping the first mapping of each of the plurality of map segments.

The unmap manager 146 may update the first flag information from 'M' to The first flag information may correspond to each of the second to $10^{th}$ map segments stored in the first table 610_1. The processor 134 may store, in the memory device 150, the first table 610_1 in which the unmapping information on each of the second to $10^{th}$ map segments is stored. The processor 134 may not store, in the memory device 150, the second table in which the map data corresponding to each of the second to $10^{th}$ map segments is stored.

Referring to FIG. 6E, the unmap manager 146 may perform the unmap operation for the second mapping of the logical addresses corresponding to the target logical addresses among the plurality of logical addresses, which are included in the logical group mapped with the $11^{th}$ map segment in the third region. In FIG. 6E, the second table 630_5 indicates the state of the second table 630 before the unmap operation is performed, and the second table 630_7 indicates the state of the second table 630 after the unmap operation is performed. Specifically, the target logical addresses among the plurality of logical addresses, which are included in the logical group mapped with the $11^{th}$ map segment, are the $1001^{st}$ to $1050^{th}$ logical addresses LAB 1001 to LBA 1050. The unmap manager 146 may individually unmap the second mapping of each of the $1001^{st}$ to $1050^{th}$ logical addresses LAB 1001 to LBA 1050 according to the unmap command. Further, the unmap manager 146 may update the second flag information from 'M' to 'U'. The second flag information may correspond to the $1001^{st}$ to $1050^{th}$ logical addresses LAB 1001 to LBA 1050 stored in the second table 630_5. The processor 134 may store, in the memory device 150, the second table 630_7 in which the unmapping information on the $1001^{st}$ to $1050^{th}$ logical addresses LAB 1001 to LBA 1050 is stored.

Although not illustrated, when the entire size of the map data for the unmap command provided from the host 102 is less than a threshold value, the unmap manager 146 may perform an operation of unmapping the second mapping of the target logical addresses. In this case, the unmap manager 146 does not perform an operation of unmapping the first mapping.

FIG. 7 is a flowchart illustrating an operating process of the memory system 110 in accordance with an embodiment. Particularly, FIG. 7 illustrates a process in which the memory system 110 processes an unmap command received from the host 102.

Referring to FIG. 7, in step S701, the processor 134 may load first mapping information and second mapping information from the memory device 150, and store the loaded information in the memory 144.

In step S703, the unmap manager 146 may compare the entire size of map data corresponding to target logical addresses (i.e., target map data) with a threshold value, which may be predetermined.

When it is determined that the entire size of the target map data is greater than or equal to the threshold value (that is, "Yes" in step S703), the unmap manager 146 may sort (or divide) a plurality of map segments into a plurality of regions or groups in step S705. For example, the unmap manager 146 may sort the plurality of map segments into first, second and third groups or regions. As described with reference to FIG. 6B, the unmap manager 146 may sort map segments into the first region or the third region. The map segments of the first and third regions may be mapped with a logical group in which some of a plurality of logical addresses are the target logical addresses. The unmap manager 146 may sort map segments into the second region. The map segments of the second region may be mapped with a logical group in which all the logical addresses are the target logical addresses.

In step S707, the unmap manager 146 may perform an unmap operation for second mapping of the target logical addresses among the plurality of logical addresses, which are included in the logical group mapped with the map segments included in the first and third regions.

In step S709, the processor 134 may store, in the memory device 150, second mapping information on each of the target logical addresses on which the unmap operation was performed in step S707. In addition, the processor 134 may store a second table in which the second mapping information is stored, in the memory device 150.

In step S711, the unmap manager 146 may perform the unmap operation for first mapping of the map segments included in the second region.

In step S713, the processor 134 may store, in the memory device 150, first mapping information on the map segments on which the unmap operation was performed in step S711. In addition, the processor 134 may store the second table in which the first mapping information is recorded, in the memory device 150.

When it is determined that the entire size of the target map data is less than the threshold value (that is, "No" in step S703), the unmap manager 146 may perform the unmap operation for the second mapping of the target logical addresses.

In step S717, the processor 134 may store, in the memory device 150, the second mapping information on each of the target logical addresses on which the unmap operation was performed in step S715. In addition, the processor 134 may store the second table in which the second mapping information is stored, in the memory device 150.

FIGS. 8 to 16 are diagrams schematically illustrating application examples of the data processing system of FIGS. 1 to 7 according to various embodiments.

Figure 8:
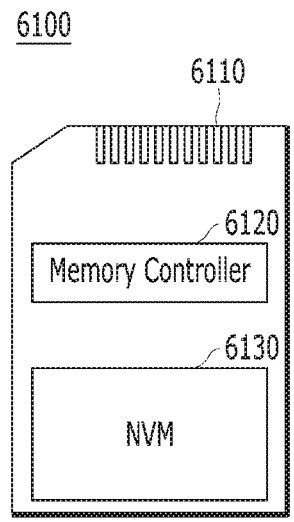
FIGS. 8 to 16 are diagrams schematically illustrating application examples of the data processing system, in accordance with various embodiments of the present invention.

FIG. 8 is a diagram schematically illustrating the data processing system including the memory system in accordance with an embodiment. For example, FIG. 8 schematically illustrates a memory card system 6100 to which the memory system in accordance with an embodiment is applied.

Referring to FIG. 8, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as shown in FIG. 1, the memory controller 6120 may include a random access memory (RAM), a processor, a host interface, a memory interface and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system in accordance with an embodiment may be applied to wired and/or wireless electronic devices or particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). Also, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., miniSD card, microSD card and SDHC card) and a universal flash storage (UFS).

Figure 9:
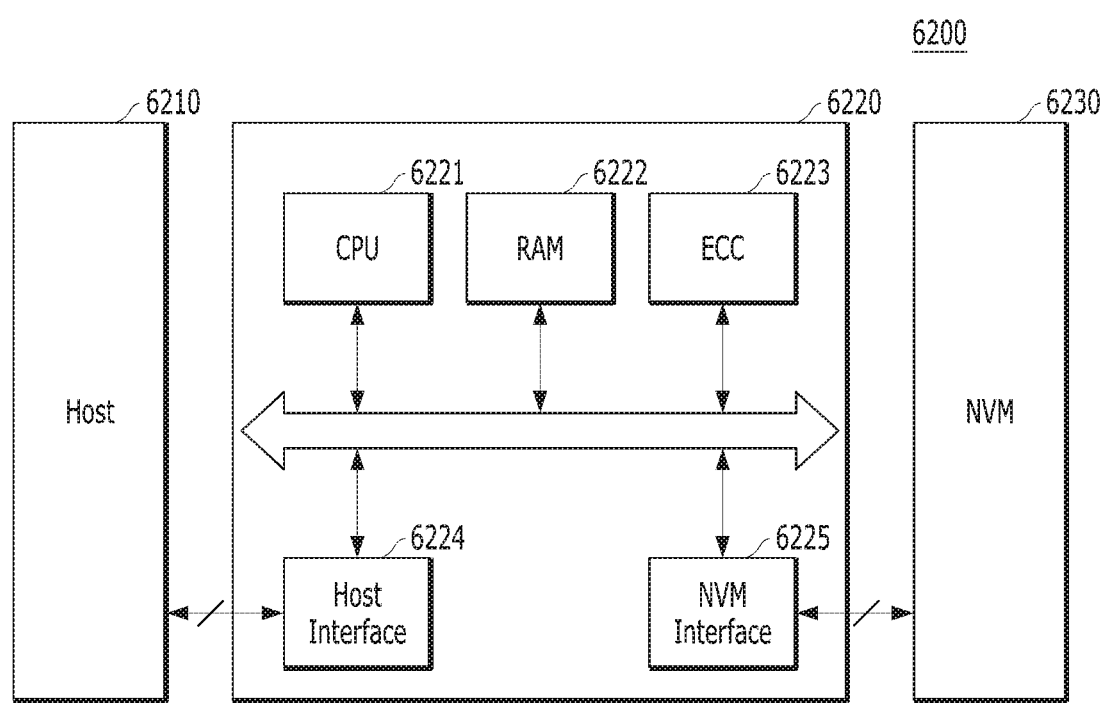

FIG. 9 is a diagram schematically illustrating another example of a data processing system 6200 including the memory system in accordance with an embodiment.

Referring to FIG. 9, the data processing system 6200 may include a memory device 6230 having one or more nonvolatile memories (NVMs) and a memory controller 6220 for controlling the memory device 6230. The data processing system 6200 may serve as a storage medium such as a memory card (CF card, SD card or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component 138 of the controller 130 illustrated in FIG. I. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may exchange data with the host 6210 through the host interface 6224, and exchange data with the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then transmit and/or receive data to and/or from the external device. In particular, as the memory controller 6220 is configured to communicate with the external device through one or more of various communication protocols, the memory system and the data processing system in accordance with an embodiment may be applied to wired and/or wireless electronic devices, particularly mobile electronic devices.

Figure 10:
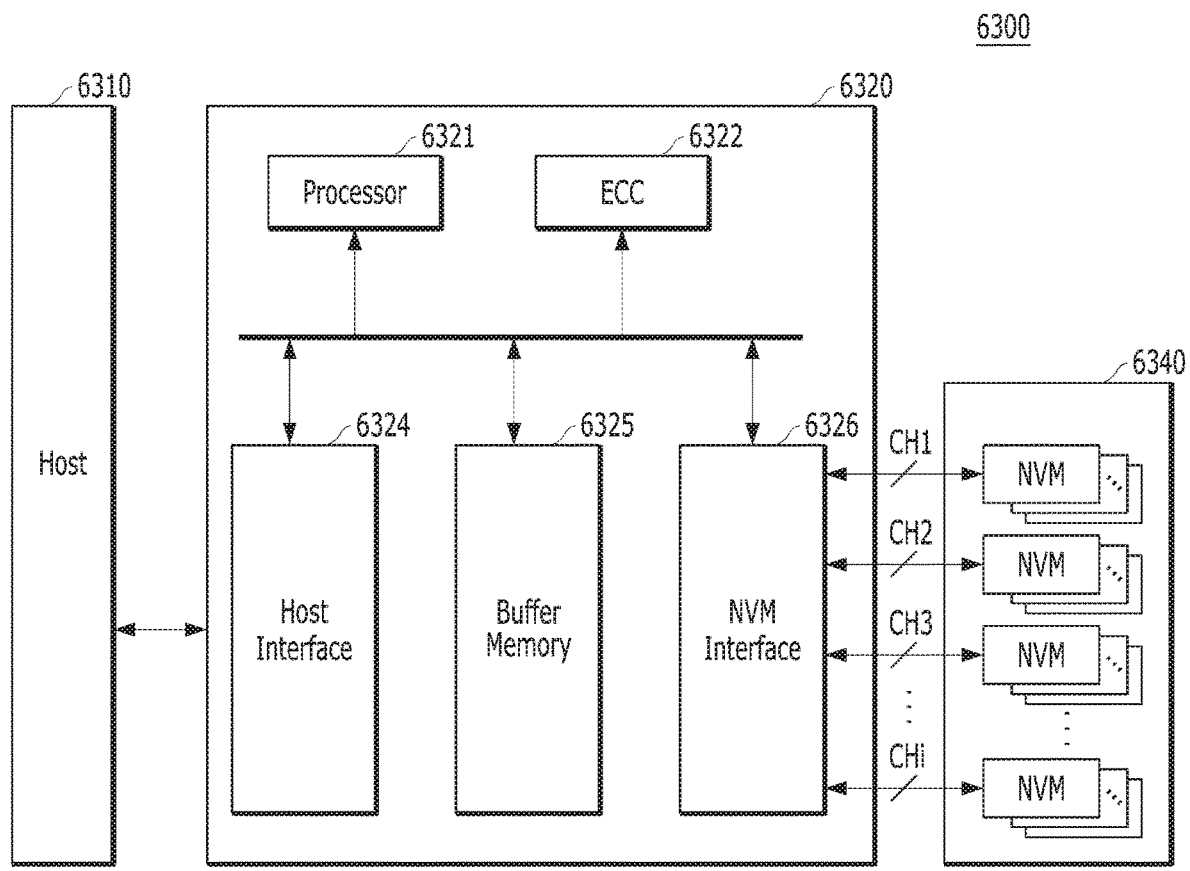

FIG. 10 is a diagram schematically illustrating another example of the data processing system including the memory system in accordance with an embodiment. For example, FIG. 10 schematically illustrates a solid state drive (SSD) 6300 to which the memory system may be applied.

Referring to FIG. 10, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of various volatile memories such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and phase-change RAM (PRAM). By way of example, FIG. 10 illustrates that the buffer memory 6325 is disposed in the controller 6320. However, the buffer memory 6325 may be disposed externally to, and in communication with, the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 11:
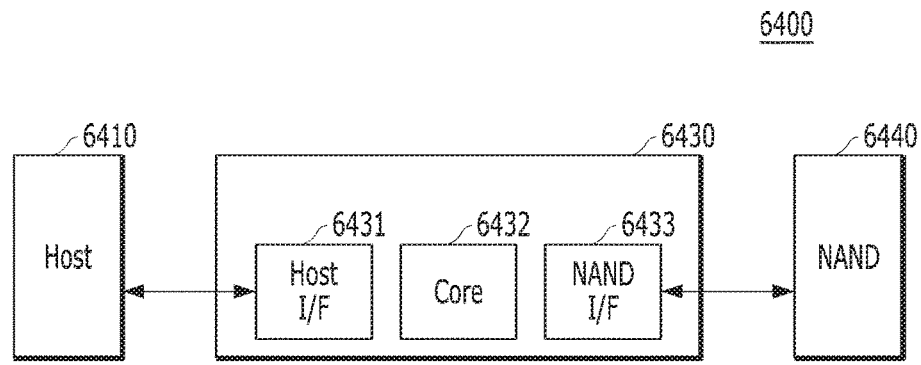

FIG. 11 is a diagram schematically illustrating another example of the data processing system including the memory system in accordance with an embodiment. FIG. 11 schematically illustrates an embedded Multi-Media Card (eMMC) 6400 to which the memory system may be applied.

Referring to FIG. 11, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

FIGS. 12 to 15 are diagrams schematically illustrating other examples of the data processing system including the memory system in accordance with one or more embodiments. FIGS. 12 to 15 schematically illustrate universal flash storage (UFS) systems to which the memory system may be applied.

Referring to FIGS. 12 to 15, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices or particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices or particularly mobile electronic devices through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 9 to 11, and the UFS cards 6530, 6630, 6730 and 6830 may be embodied in the form of the memory card system 6100 described with reference to FIG. 8.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Hash Drives (UFDs), multi-media card (MMC), secure digital (SD), mini-SD, and micro-SD.

Figure 12:
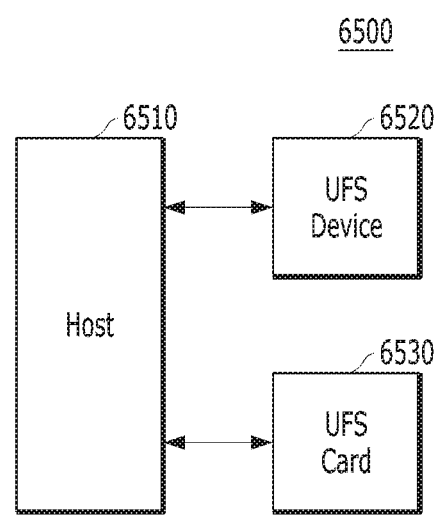

In the UFS system 6500 illustrated in FIG. 12, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In FIG. 12, the configuration in which one UFS device 6520 and one UFS card 6530 are connected to the host 6510 is illustrated by way of example. However, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 13:
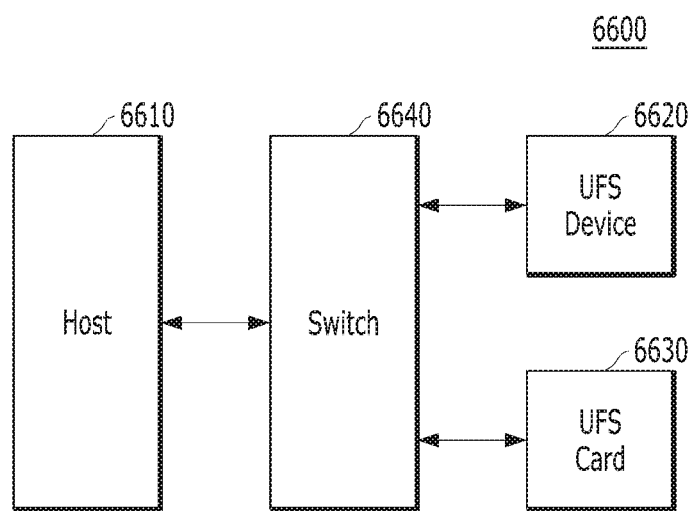

In the UFS system 6600 illustrated in FIG. 13, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In FIG. 13, the configuration in which one UFS device 6620 and one UFS card 6630 are connected to the switching module 6640 is illustrated by way of example. However, a plurality of UFS devices and UFS cards may be connected in parallel or in the form of a star to the switching module 6640, and a plurality of UFS cards may be connected in series or in the form of a chain to the UFS device 6620.

Figure 14:
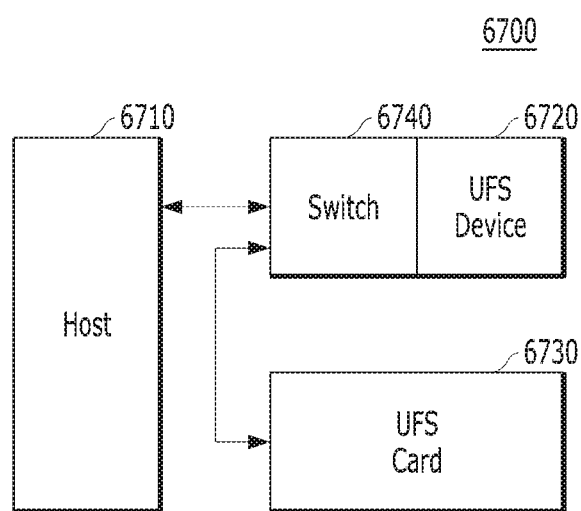

In the UFS system 6700 illustrated in FIG. 14, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In FIG. 14, the configuration in which one UFS device 6720 and one UFS card 6730 are connected to the switching module 6740 is illustrated by way of example. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 15:
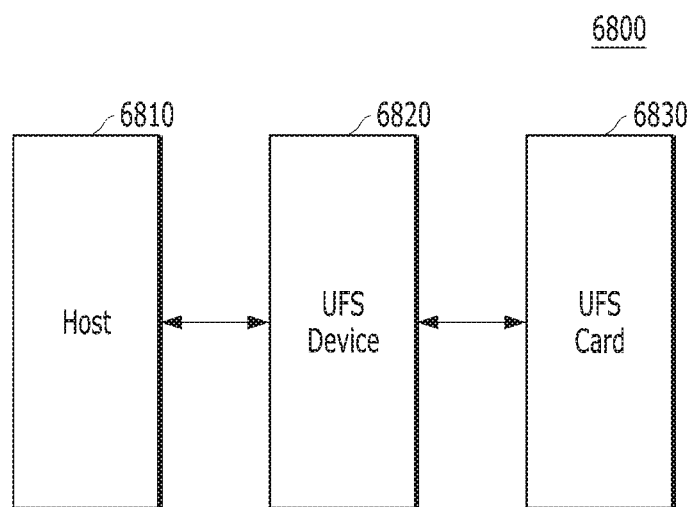

In the UFS system 6800 illustrated in FIG. 15, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In FIG. 15, the configuration in which one UFS device 6820 is connected to the host 6810 and one UFS card 6830 is connected to the UFS device 6820 is illustrated by way of example. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 16:
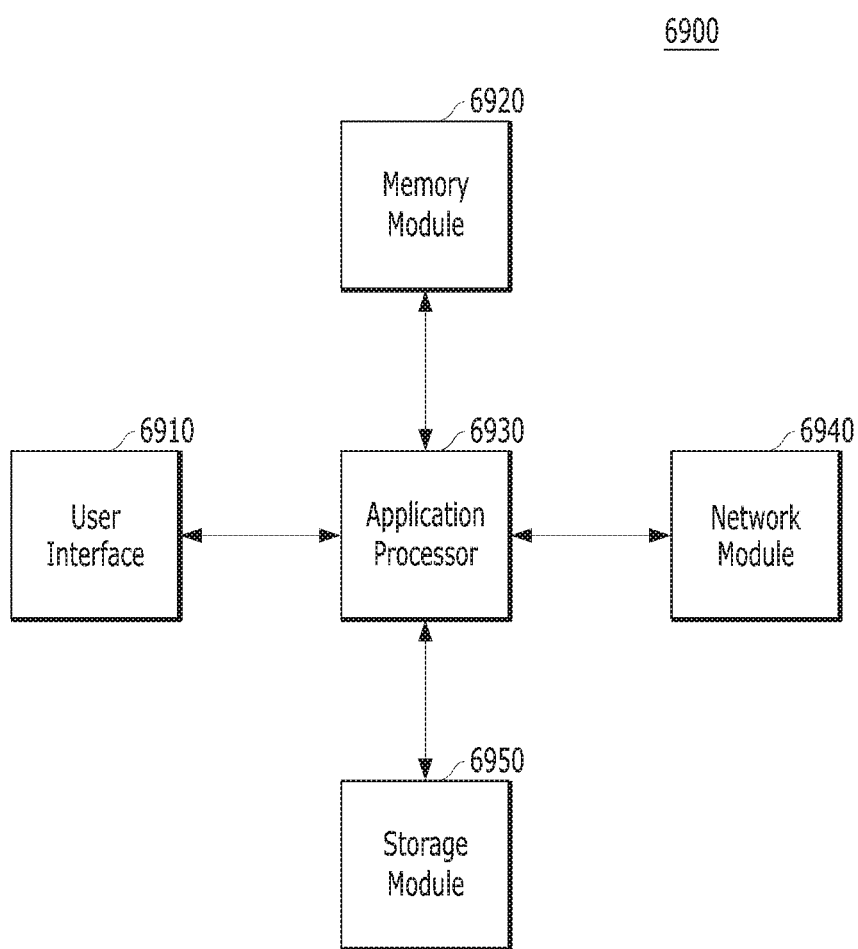

FIG. 16 is a diagram schematically illustrating another example of the data processing system including the memory system in accordance with an embodiment. FIG. 16 is a diagram schematically illustrating a user system 6900 to which the memory system may be applied.

Referring to FIG. 16, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR2 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the application processor 6930 on a display/touch module of the mobile electronic device, or support a function of receiving data from the touch panel.

The memory system according to the embodiments of the present invention can efficiently process an unmapped command for the large-capacity map data, thereby improving the unmap performance of the memory system.

While the present invention has been illustrated and described with respect to specific embodiments, it will be apparent to those skilled in the art in light of the present disclosure that various changes and modifications may be made without departing from the spirit and scope of the invention as defined in the following claims.

What is claimed is:

1. A memory system comprising:
a memory device suitable for storing first mapping information and second mapping information associated with target logical addresses for an unmap command; and
a controller suitable for loading the first and second mapping information from the memory device, comparing a size of target map data corresponding to the target logical addresses with a threshold value, sorting a plurality of map segments mapped with a plurality of target logical groups including one or more of the target logical addresses, respectively, into a plurality of regions based on a result of the comparing, and performing an unmap operation on each of the map segments included in the plurality of regions,
wherein the first mapping information includes information on mapping relationships between the plurality of map segments and the plurality of target logical groups, and the second mapping information includes information on mapping relationships between the target logical addresses and corresponding physical addresses.

2. The memory system of claim 1, wherein the controller includes:
a memory suitable for storing the first and second mapping information;
a processor suitable for loading the first and second mapping information from the memory device into the memory; and
an unmap manager suitable for comparing the size of the target map data with the threshold value, sorting the plurality of map segments into the plurality of regions based on the comparing result, and performing the unmap operation on the first mapping information of each of the map segments in the plurality of regions.

3. The memory system of claim 2, wherein, when the size of the target map data is greater than or equal to the threshold value, the unmap manager sorts, into a first region and a third region, map segments being mapped with a first logical group in which only some of the plurality of logical addresses are the target logical addresses, among the plurality of map segments, and sorts, into a second region, map segments being mapped with a second logical group in which all logical addresses are the target logical addresses.

4. The memory system of claim 3, wherein the unmap manager sorts, into the first region, map segments being mapped with a logical group including a starting logical address of the target logical addresses in the first logical group, and sorts, into the third region, map segments being mapped with a logical group including a last logical address of the target logical addresses in the first logical group.

5. The memory system of claim 3, wherein the unmap manager performs a first unmap operation on the first mapping information of each of the map segments in the second region, and performs a second unmap operation on the second mapping information of the target logical addresses in the logical groups which are mapped with the respective map segments of the first region and the respective map segments of the third region.

6. The memory system of claim 5, wherein the processor stores the first mapping information in the memory device after the first unmap operation is performed.

7. The memory system of claim 5, wherein the processor stores the second mapping information in the memory device after the second unmap operation is performed.

8. The memory system of claim 2, wherein the unmap manager performs a third unmap operation on the second mapping information of the target logical addresses when the entire size of the target map data is less than the threshold value.

9. The memory system of claim 8, wherein the processor stores the second mapping information in the memory device after the third unmap operation is performed.

10. The memory system of claim 2, wherein the memory stores a first table in which the first mapping information is stored and a second table in which the second mapping information is stored.

11. An operating method of a memory system, the operating method comprising:
receiving an unmap command;
loading first mapping information and second mapping information associated with target logical addresses for the unmap command from a memory device, and storing the first and second mapping information in a memory;

comparing a size of target map data corresponding to the target logical addresses with a threshold value;

sorting a plurality of map segments mapped with a plurality of target logical groups including one or more of the target logical addresses, respectively, into a plurality of regions based on a result of the comparing; and performing an unmap operation on each of map segments included in any one of the plurality of regions, wherein the first mapping information includes information on mapping relationships between the plurality of map segments and the plurality of target logical groups, and the second mapping information includes information on mapping relationships between the target logical addresses and corresponding physical addresses.

12. The operating method of claim 11, wherein the sorting of the plurality of map segments into the plurality of regions comprises sorting the plurality of map segments mapped with the target logical groups into the plurality of regions when the size of the target map data is greater than or equal to the threshold value.

13. The operating method of claim 12, wherein the sorting of the plurality of map segments into the plurality of regions comprises sorting, into a first region and a third region, map segments being mapped with a first logical group in which only some of a plurality of logical addresses are the target logical addresses, among the plurality of map segments, and sorting, into a second region, map segments being mapped with a second logical group in which all logical addresses are the target logical addresses.

14. The operating method of claim 13, wherein the sorting of the plurality of map segments into the plurality of regions includes:

sorting, into the first region, map segments being mapped with a logical group including a starting logical address of the target logical addresses in the first logical group; and sorting, into the third region, map segments being mapped with a logical group including a last logical address of the target logical addresses in the first logical group.

15. The operating method of claim 13, wherein the performing of the unmap operation includes:

performing a first unmap operation on the first mapping information of each of the map segments in the second region; and performing a second unmap operation on the second mapping information of the target logical addresses in the logical groups mapped with the respective map segments of the first region and the respective map segments of the third region.

16. The operating method of claim 15, further comprising storing the first mapping information in the memory device after the first unmap operation is performed.

17. The operating method of claim 15, further comprising storing the second mapping information in the memory device after the second unmap operation is performed.

18. The operating method of claim 11, wherein the performing of the unmap operation comprises performing a third unmap operation on the second mapping information of the target logical addresses, when the size of the target map data is less than the threshold value.

19. The operating method of claim 18, further comprising storing the second mapping information in the memory device after the third unmap operation is performed.

20. A memory system comprising:

a memory device suitable for storing first mapping information and second mapping information, the first mapping information including information on mapping between a plurality of map segments and a plurality of logical groups, each logical group including one or more logical addresses, and the second mapping information including information on mapping between a plurality of logical addresses and a plurality of physical addresses; and a controller including a memory, suitable for:

loading, from the memory device, the first mapping information and the second mapping information associated with an unmap command, in the memory;

dividing the plurality of map segments, which includes a first map segment, a last map segment and remaining map segments, into a first group that includes the first map segment, a second group that includes the remaining map segments and a third group that includes the last map segment; and unmapping the second mapping information for the first and third groups, and the first mapping information for the second group.

* * * * *